United States Patent Office 2,716,271
Patented Aug. 30, 1955

2,716,271

ENAMELING PROCESS AND ARTICLE PRODUCED THEREBY

Waldo W. Higgins, Kankakee, Ill., assignor to A. O. Smith Corporation, Milwaukee, Wis., a corporation of New York No Drawing. Original application September 22, 1943, Serial No. 503,442. Divided and this application May 6, 1949, Serial No. 91,876

3 Claims. (Cl. 29—195)

This invention relates to enameling processes and articles produced thereby. It has been applied to the ceramic enameling of steel base ordinarily of rolled sheet stock, and is applicable to the coating of steel with many types of applied coatings.

In ceramic enameling, the coating material is usually applied to the surface of the steel either by dipping or spraying, and after drying it is fired at a temperature sufficiently high to fuse the material and produce a glossy impervious coating bonded throughout to the steel base. Depending upon the enamel composition, the firing temperature may range from about 1300° F. for soft enamels to as high as 1700° F. for hard enamels. In order to produce the desired bond, it is customary to employ a ground coat material, usually containing cobalt oxide, as the first coat, and to apply one or more subsequent cover coats of a material usually not adaptable for ground coats. Each coat is separately fired.

It has been observed that in the firing of the enamel ground coat a very considerable amount of boiling occurs in which minute bubbles rise to the surface from the interface between the steel base and the coating, known as primary boiling. Copper head defects result from excessive primary boiling when the larger bubbles break and expose the steel base.

It has been assumed in the past that the bubbles result from gas formation from the reaction of the various constituents of the coating and also from reaction between the coating and the base. Only recently has it been suggested that some or all of the gas forming the bubbles might result from the giving off of gas from the steel base, possibly hydrogen gas released from the steel and driven off as the steel heats up to the firing temperature.

Many defects in enamel can be traced to hydrogen resulting from an excess of this gas in the steel. For instance, it has been thought that fish scaling of the enamel is the result of hydrogen gas pressure. Tests have shown that when an acid such as dilute sulphuric acid is allowed to eat the back of an enameled sheet steel base in a restricted area, the enamel coating on the front begins to fish scale severely. This is believed to be due to the nascent hydrogen given off as a result of the reaction of the acid with the steel, the hydrogen diffusing through the steel to the opposite side where it builds up sufficient pressure and destroys the enamel bond. See "Journal of the American Ceramic Society," vol. 23, No. 7, pages 187 to 221 and vol. 24, No. 12, pages 383 to 392.

In applying cover coats a phenomenon known as "reboiling" occurs, in which minute bubbles rise up from the ground coat steel interface causing rupture of the cover coat and forming "black specks" and the like. This phenomenon has been attributed to the presence of hydrogen in the steel. See Zapffe and Sims on "Relation of defects in enamel coatings to hydrogen in steel," "Journal of the American Ceramic Society," vol 23, No. 7, pages 187 to 221 (1940). The same is true with respect to defective bonding of enamels. See "Journal of the American Ceramic Society," vol. 26, No. 5, May 1, 1943, pages 151 to 159.

The present inventor has discovered that where excessive primary boiling occurs in enameling, there is a strong likelihood that reboiling will occur and that the enamel will fish scale. From this discovery the cause of primary boiling would seem to be hydrogen in the steel, although no one heretofore has known or suggested this fact.

Another defect occurring in ground coats results when an excess of moisture or water vapor is present in the furnace atmosphere during firing. The defect embodies a rough orange peel type of surface known as water vapor condition. An examination of the coat shows that close to the interface between the enamel and steel there is a layer of large bubbles, there being a bubble beneath each hump in the surface. This fairly continuous layer of bubbles gives a zone of weakness in the enamel coating, allowing the enamel to spall. Water vapor condition is very likely to occur in commercial enameling operations where the dew point of the furnace atmosphere gets above 100° F. and where relatively thin sheet steel pieces are being coated simultaneously on both sides with enamel.

These various defects are serious in every enameling plant and result in a balancing of enameling composition, the processing and equipment design, and the steel with cut-and-try methods until a particular technique is developed for a given product in the particular plant, which is adhered to closely in order to avoid trouble. This makes the interchange and reconciliation of detail information in the enameling industry difficult.

The present invention is based upon the conception of the present inventor that most all of these defects result from hydrogen in the steel, and that if the steel could be made to resist the diffusion, absorption or release of hydrogen, the various techniques and compositions involved in enameling would no longer be critical in the production of perfect coats of enamel. The invention is further based upon the discovery that certain alloy constituents can be added to steel or to its surface to have what is thought to be one or more of the following effects: (1) preventing or retarding the diffusion of nascent hydrogen through the steel; (2) preventing or reducing the absorption of hydrogen by the steel; and (3) preventing the release of hydrogen from the steel in sufficient quantity to injure the enamel. Taken individually and collectively the above enumerated effects may be termed a stabilization of hydrogen and the constituents having such effects may be called hydrogen stabilizers.

The principal object of the present invention is to prevent injury to coatings by evolution of hydrogen from the base metal.

Another object of the invention is to provide an enamel coated steel article in which the enamel is free from the defects caused by primary boiling and also from fish scaling, reboiling and water vapor condition.

Another object is to provide a method of making ceramic enameled steel articles free from defects in the enamel without regard to careful technique, enamel composition and special firing atmospheres.

In support of these objects the invention results from the discovery that the addition of certain alloy constituents to the steel or its surface eliminates the enameling defects referred to. Chromium and titanium additions to the steel have the desired effect. These may be added either singly or in combination to the steel.

The process, in its most comprehensive phase, involves the prevention of hydrogen phenomena injurious to coatings by adding to the steel, either in its manufacture or by subsequent impregnation and diffusion, a metal producing one or more of the effects enumerated above.

The process as applied to ceramic enameling involves the applying and firing of the enamel in the presence of a metal such as chromium, titanium, or the like, alloyed with the steel base in sufficient quantity to effect the desired results with respect to hydrogen phenomena, and insufficient to embrittle or otherwise change the physical properties of the steel in a manner making it unsuitable for use for sheet enameling stock.

A composition of steel found to give excellent results contained about .50% titanium with .07% carbon and .39% manganese. Good results have been obtained with as low as .30% of titanium, and tests show that there should be a considerable excess of titanium above the amount required to kill the steel. The upper limit of titanium content is not known and possibly should depend upon other factors such as cost, other constituents and the physical characteristics desired.

In the case of chromium, excellent results have been obtained with the ordinary 4 to 6% chromium steel.

As low as 1% of chromium in the steel gives very superior results over present-day enameling stocks. However, chromium has a tendency to make steel difficult to fabricate, and the amount that can be employed depends upon the fabrication requirements of the article and the cost involved. It should be kept as low as possible consistent with good enameling results and with the requirements as to physical properties of the steel. In general a 1% chromium steel may be substituted for most enameling stocks.

The steel should be reasonably low in alloying constituents, preferably less than 5%, since the addition of many alloy ingredients lowers the transformation point to such an extent as to cause crazing. This is particularly true of vanadium, molybdenum, silicon, manganese and nickel.

Samples of steel of the compositions referred to can be ceramic enameled without danger of producing primary boiling, reboiling, fish scaling, or water vapor condition. Such samples of sheet steel containing titanium in the amounts indicated, coated on one side with ceramic enamel and subjected to the sulphuric acid test on the other side, proved to retain the enamel coat without fish scaling or other defect. The firing of the articles in atmospheres of high water vapor content does not seem to injure the enamel or to produce the rough orange peel like surface so noticeable in such firing of enamel heretofore. The same was true with respect to chromium steel samples.

The impregnation of the surface of steel with corresponding amounts of either chromium or titanium gives the same results as the adding of such ingredients to the steel during its manufacture. Samples of low carbon, low alloy enameling stock which were packed in either ferrochrome or ferro-titanium and heated to a temperature and for a time sufficient to cause diffusion of a substantial or appreciable amount of the material into the steel surface for a sufficient depth, had the desired characteristics with respect to hydrogen phenomena. For example, an impregnation to a depth of about three-thousandths of an inch gave very excellent results.

This result is interesting in view of the fact that attempts to coat the surface of the steel with ferrochromium and ferro-titanium prior to enameling without impregnation proved futile and did not give the desired result.

It is also interesting to note that metals ordinarily employed for killing steel, such as silicon and aluminum, do not produce the results. At one time it was thought that carbon stabilization was important, but this is not the property of chromium, and molybdenum which is considered a good carbon stabilizer does not produce the desired results where added in small amounts.

Cover coats heretofore considered unsuitable for direct application to steel have been applied to steels containing chromium or titanium in the amounts specified with excellent results. White enamel coats which heretofore had to be applied over a dark ground coat have been applied directly to steels containing chromium or titanium, thereby accomplishing one of the dreams of every commercial enameler.

Similarly, acid proof enamels can be applied directly to the steel without requiring ground coats which tend to contaminate the enamels and reduce their acid resistance.

The invention is therefore applicable to either single or multiple coat enameling and eliminates the difficulties of contamination from present-day ground coats.

The importance of the present invention arises from the fact that many defects in ceramic enamels can be absolutely eliminated by its practice. Since many paints and lacquers, as well as electro-plated coatings, when applied to steel are more sensitive to hydrogen evolution destroying their bond, the invention is applicable to protect such coatings from disruption in services where heating and cooling or other treatment has a tendency to cause undesirable hydrogen phenomena.

This application constitutes a continuation of the copending application filed by applicant on September 22, 1943, Serial No. 503,442, for the same invention, and now abandoned.

Various embodiments of the invention may be employed within the scope of the accompanying claims.

I claim:

1. The process of producing a coated steel article, comprising selecting a killed steel base for the article, impregnating the steel surface of the article with from 1% to 6% chromium to prevent hydrogen phenomena, and thereafter applying to said surface a coating which is susceptible to damage by hydrogen phenomena, whereby said coating is bonded to said surface and is free from defects due to hydrogen phenomena.

2. The process of producing a coated steel article, comprising selecting a killed steel base for the article, impregnating the steel surface of the article with an appreciable quantity of titanium to prevent hydrogen phenomena, and thereafter applying to said surface a coating which is susceptible to damage by hydrogen phenomena, whereby said coating is bonded to said surface and is free from defects due to hydrogen phenomena.

3. An article of manufacture comprising a low alloy killed steel base having a total alloy content not in excess of 5% and which alloy content consists principally of a hydrogen phenomena inhibitor selected from the group consisting of chromium and titanium and alloyed with the surface thereof for a substantial depth, and a ceramic enamel coating fired on the surface thereof and free from defects caused by hydrogen phenomena.

References Cited in the file of this patent

UNITED STATES PATENTS

| | | |
|---|---|---|
| 1,996,568 | Butts | Apr. 2, 1935 |
| 2,059,893 | Naumann | Nov. 3, 1936 |
| 2,279,935 | Belding | Apr. 14, 1942 |
| 2,495,836 | Comstock | Jan. 31, 1950 |

OTHER REFERENCES

Titanium and Its Use in Steel, Titanium Alloy Manufacturing Co., 1940.